United States Patent [19]

van Duuren

[11] 4,003,042
[45] Jan. 11, 1977

[54] SYSTEM FOR THE TRANSFER OF TWO STATES BY MULTIPLE SCANNING

[76] Inventor: Hendrik Cornelis Anthony van Duuren, 83 Storm van's-Gravesandeweg, Wassenaar, Netherlands

[22] Filed: Jan. 29, 1975

[21] Appl. No.: 545,113

Related U.S. Application Data

[63] Continuation-in-part of Ser. No. 354,251, April 25, 1973, abandoned.

[52] U.S. Cl. .................. 340/347 DD; 325/38 R
[51] Int. Cl.² ................................. H03K 13/24
[58] Field of Search ........ 340/347 DD; 360/40–44; 178/66–68, 69.5 R, 3; 325/38 R

[56] References Cited
UNITED STATES PATENTS

| | | | |
|---|---|---|---|
| 3,394,312 | 7/1968 | Pfeiffer | 325/38 R |
| 3,508,228 | 4/1970 | Bishop | 340/347 DD |
| R27,812 | 11/1973 | Lipp | 360/44 |

OTHER PUBLICATIONS

Travis et al. "The Bell System Technical Journal" Oct. 1965 pp. 1567–1604.

Primary Examiner—Charles D. Miller

[57] ABSTRACT

An improvement in applicant's co-pending application on a system for the transfer of point of time and direction of a transition between two states of an input by means of a code word of a predetermined plurality of bits, which improvement comprises using at least one less bit in the code word for indicating the direction of transition. The apparatus for carrying out this system comprises at a transmitter a device for scanning the input signal at a predetermined numbered of successive timed intervals corresponding at least to the number of bits in the code word to be generated, determining which interval or zone the transition in the binary input signal occurred, and generating the resulting code word in an encoder comprising logic circuits and a shift register having the same number of stages as bits in the code word. At the receiver the code word is reformed by registering it in a shift register having one more stage than the bits in the word, determining in a first logic circuit the direction of the transition, and in a second logic circuit the time zone in which the transition took place in order to regenerate the original binary signal. Usually two bits of the code word are used for indicating the time zone in which the transition occurred, and the other one or two-bits of the code word are used for indicating the direction of the transition. If two-bits are used for indicating the direction of transition, then three of the stages of the receiving shift register are connected to a majority of two out of three deciding circuit as the transition detector. In order to avoid erroneous transition detections as the bits received in the receiver shift register are shifted through the register, the stages for two-bits corresponding to the code of time zone are set to correspond with the stages for bits corresponding to the transition. For the scanning and generation of the pattern of repeated time zones and the number of bits in the code word, there are provided both at the transmitter and the receiver clock pulse generator and zone counter circuits.

8 Claims, 2 Drawing Figures

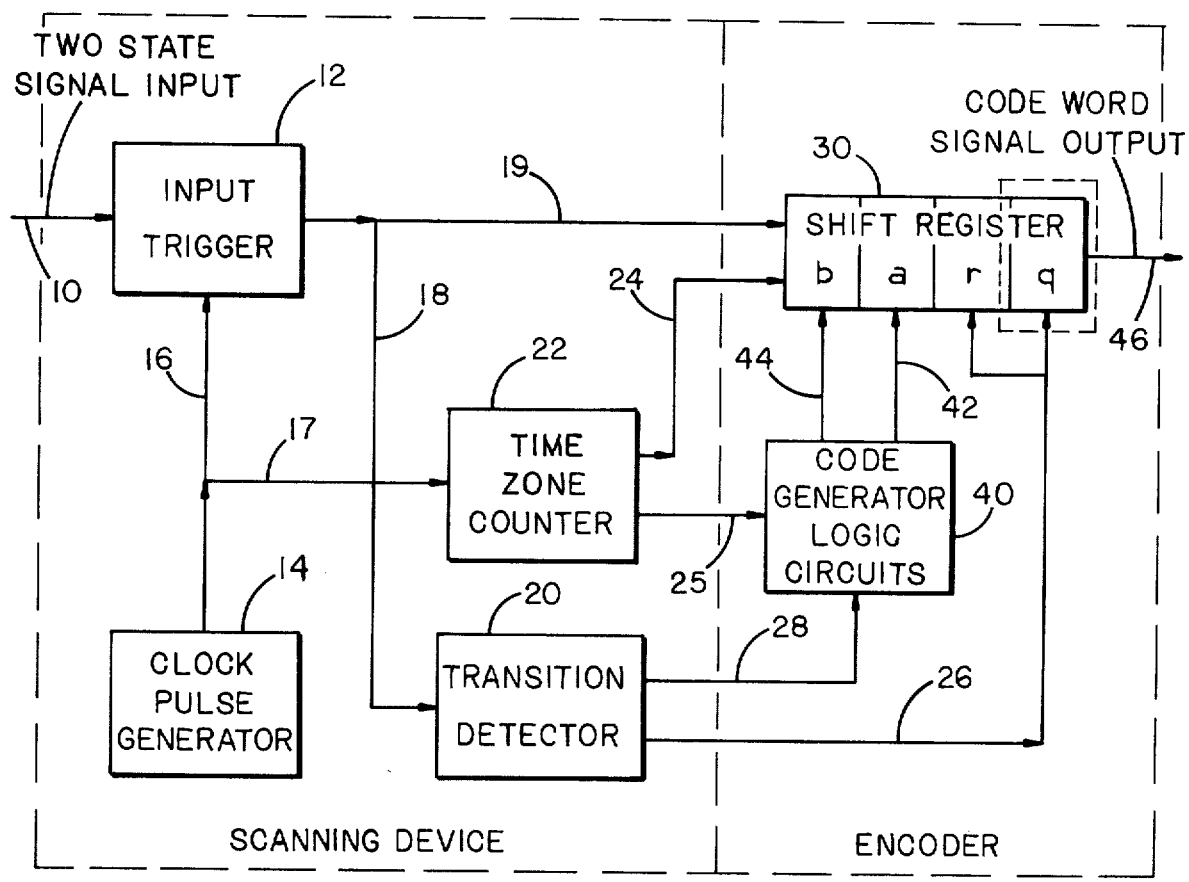
AT TRANSMITTER
FIG. I

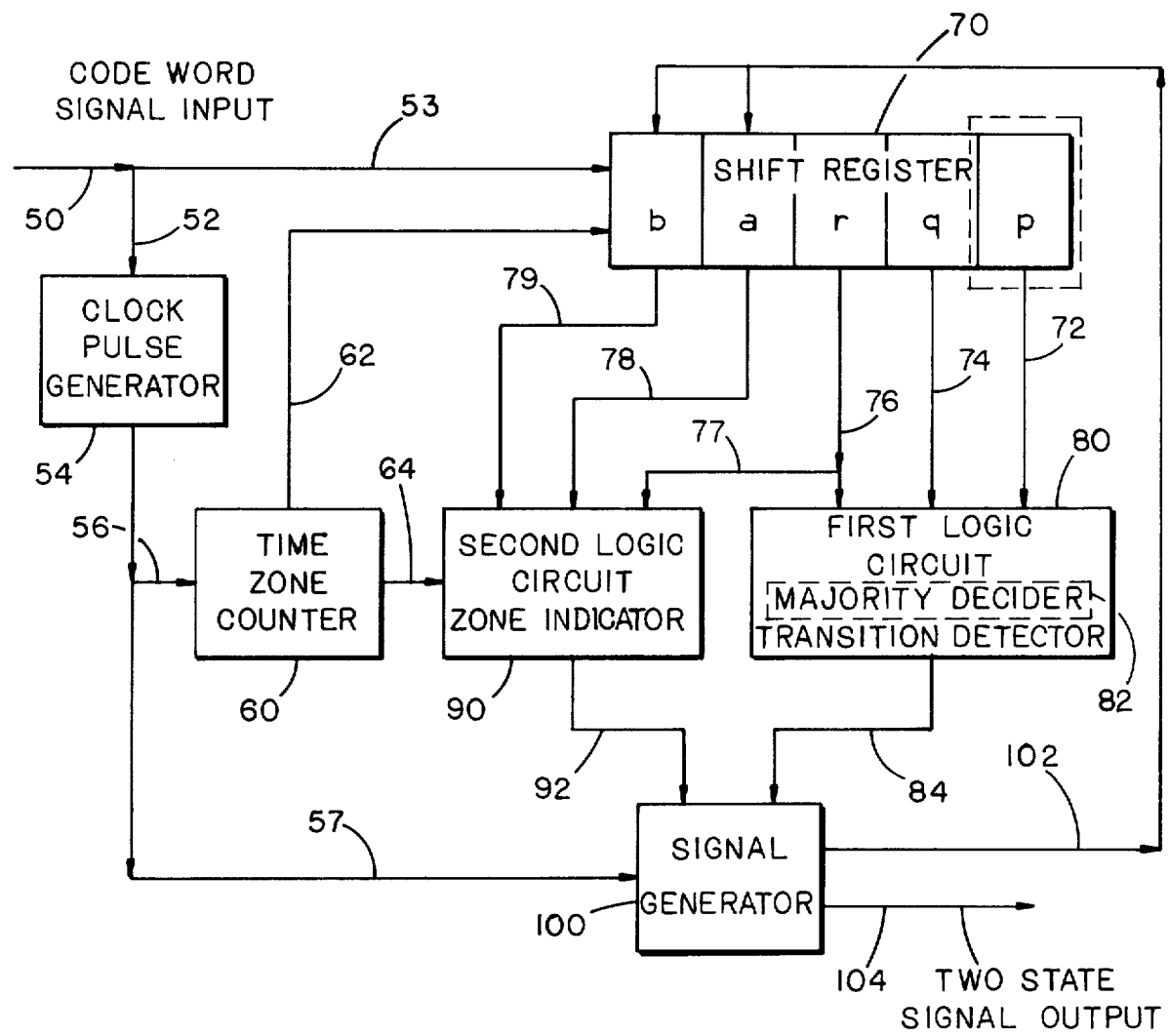
REFORMING DEVICE
AT RECEIVER
FIG. II

4,003,042

SYSTEM FOR THE TRANSFER OF TWO STATES BY MULTIPLE SCANNING

RELATED APPLICATIONS

This application is also a continuation-in-part of applicant's copending application Ser. No. 354,251 filed Apr. 25, 1973, which now has become abandoned.

This application is an improvement in applicant's co-pending applications Ser. No. 185,741 filed Oct. 1, 1971 which now has become abandoned, and has been re-filed as a continuation-in-part thereof having Ser. No. 434,829 filed Jan. 18, 1974, now U.S. Pat. No. 3,859,655 issued Jan. 7, 1975.

The disclosures of all of these prior above referred applications are hereby incorporated herein by reference as a basis for the apparatus, features and advantages mentioned in this present application.

SUMMARY OF THE INVENTION

Generally speaking, the system of this invention generates a code word of a predetermined number of bits for indicating both the direction and the location of each transition in a two state input signal. The number of bits in the code word may correspond to the number of time zones in a successively repeated pattern of these zones, which continuously scan the two state input signal. The number of bits in the code word is four or three, with two-bits being employed for encoding the location or time zone in which the transition occurs in the scanning pattern successively of repeated time zones, and the other one or two-bits are used for determining the direction of transition. This code word is a binary code word in which each bit either has a "1" or "0" value, which corresponds to one or the other of the two states of the original input signal, such as a "+" or "−", or higher or lower potential level. This code word is then transmitted, received, and from it the original two state signal is reformed.

The apparatus at the transmitter comprises a device for scanning the two state input signal which device comprises: an input trigger circuit, a clock, a time zone counter for counting the number of zones in each scanning pattern and correspondingly the number of bits in the code word to be generated, and a transition detector for detecting the changes of state in the input signal. From the outputs of the input trigger, the transition detector, and the zone counter, the code word is generated in a shift register comprising the same number of stages as bits in the code word. Two of these stages are controlled by a code generator logic circuit that indicates the particular time zone in the scanning pattern in which the transition occurred, and the other remaining one or two stages, depending upon whether the code word comprises three or four-bits, respectively, indicates the direction of the transition, or to which state the input signal has changed. The resulting code word for each transition or change in state of the input signal is then transmitted to the receiver.

At the receiver the input code word is registered in a shift register containing one more stage than the number of bits in the code word. Connected to this receiving shift register are a first logic circuit for determining the direction of the transition and a second logic circuit for determining the particular time zone in the scanning pattern in which the transition occurred. The resulting outputs from these two logic circuits are then connected to a signal regenerator for regenerating a signal similar to the original two state signal introduced into the input of the transmitter circuit. If the code word contains two-bits for indicating the direction of transition, then three stages of the receiving shift register corresponding to the first bits of the code word received are connected to a majority decider circuit in the transition detector or first logic circuit for determining two out of three similar binary bits, in that the additional stage in the shift register should always be in the opposite condition from that of the stages corresponding to new transition state to be detected. In order to prevent the first logic circuit or transition detector from responding to any difference in condition of the stages corresponding to the time zone code bits when they are stepped through the stages corresponding to the transition detected bits, the time zone bit stages are set to correspond to the detected transition bit stages before that code word is stepped out of the receiver shift register.

Clock pulse generator and zone counter circuits are provided at both the receiver and transmitter for controlling the scanning of the two state input signals, stepping of the code word bits through their shift registers, and the regeneration of the two state signals.

OBJECTS AND ADVANTAGES

A major distinction and advantage of the system of this invention over applicant's above mentioned first prior co-pending applications, namely Ser. Nos. 185,741 and 434,829 now U.S. Pat. No. 3,859,655 issued Jan. 7, 1975 is that herein the code word is shortened by at least one-bit so that the encoding and reforming circuits at the transmitter and receiver are simpler and can be operated at a higher speed, while the chances of deformation and of errors in the generated word are generally kept within reasonable and practical proportions. Thus the code words in the present application contain one and at the most two-bits for indicating the direction of transition while in the above mentioned former applications require code words containing at least three-bits in each word for indicating the direction of transition.

Accordingly it is an object of the present invention to produce an efficient, simple, effective and economic system for converting the transition between two states of a signal into a code word, transmitting this code word, and reforming it into a two state signal while keeping the chances of deformations and error within reasonable limits.

BRIEF DESCRIPTION OF THE VIEWS

The above mentioned and other features and objects of this invention and the manner of obtaining them, will become more apparent and the invention itself will be understood best by reference to the following description of embodiments of the invention taken in conjunction with the accompanying drawings, wherein:

FIG. I is a schematic block wiring diagram of a scanning device and encoder at a transmitter embodying the apparatus for generating three or four-bit code words in accordance with this invention, with the parts shown within the dotted rectangle being eliminated for generating the three bit words; and FIG. II is a schematic block wiring diagram of a reforming device at a receiver for the code words generated in the circuit shown in FIG. I, showing in dotted rectangles two parts of the circuit which may be eliminated when only a three-bit code word is to be reformed.

DETAILED DESCRIPTION OF PREFERRED EMBODIMENTS

A. The Code Words

For the purpose of the following description, the code word having four-bits will have its successive bits identified by the letters $b$, $a$, $r$, and $q$, and the three-bit code word will comprise the letters $b$, $a$, and $r$. The duration of each bit will be indicated by the same time interval V, which interval is divided into equal time zones indicated by the numbers 0, 1, 2, and 3. This is illustrated in the following Table I:

TABLE 1

| Code word | b | a | r | q |
|---|---|---|---|---|
| detailed zone-division | 0 1 2┆3 | 0 1 2┆3 | 0 1 2┆3 | 0 1 2┆3 |

←—V—→ ←—V—→ ←—V—→ ←—V—→ t      ←—code bits—→      ←—transition bits—→

Four time zones can be employed for either the four-bit word or the three-bit word, however the three-bit word also may have its bit times V divided into only three equal zones, if desired (i.e. without 3 in dotted rectangles in Table I). In any event when information is supplied at the highest allowable level or speed, the duration of an information element, or the time between transitions of the two stage input information signal, is at least 3 V for a three-bit code word, and 4 V for a four-bit code word.

The code word bits $a$ and $b$ of each code word of three or four-bits, indicate the code of the time zone in the repeated scanning patterns of time V in which the transition in the two state input signal occurred. The code and bit $r$ or $r$ and $q$ indicate the direction of the transition and are illustrated in the following Table II:

TABLE II

| "1" to "0" | | zone | "0" to "1" | |
|---|---|---|---|---|
| r q | b a | | b a | r q |
| 0 0 | 0 0 | 0 | 1 1 | 1 1 |
| 0 0 | 1 0 | 1 | 0 1 | 1 1 |
| 0 0 | 0 1 | 2 | 1 0 | 1 1 |
| 0 0 | 1 1 | 3 | 0 0 | 1 1 |

|————code bits————|
|——————transition bits——————|

In the code word, the bits $q$, $r$, $a$ and $b$ are supposed to occur in sequence that bit $q$ presents itsef before bit $r$, and bit $r$ before bit $a$, etc.

B. At Transmitter

Referring now to FIG. I, the two state input signal is introduced via conductor 10 to an input trigger 12 which scans the input signal by the clock pulses from the clock pulse generator 14 connected thereto via conductor 16, before the input signal is conducted via conductors 18 and 19 to the transition detector 20 and shift register 30, respectively. The clock pulses from generator 14, which generator may comprise a multivibrator or other oscillator type circuit, are also conducted via conductor 17 to the zone counter 22. This counter 22 may comprise a pair of trigger circuits in series for counting the number of scanning intervals or zones in the repeated scanning pattern, which corresponds at least to the number of bits in the code word to be generated by the system of this invention in the shift register 30. Thus the output of the zone counter 22 is conducted via conductor 24 to the shift register 30 which comprises separate stages for each bit of the code word corresponding to the bits $b$, $a$, $r$ and $q$, each of which stages may comprise a trigger circuit.

The transition detector 20 which may comprise a pair of trigger circuits, one for each of the two different transition states, has one output indicating the state after the transition. This one output is conducted via conductor 26 to the stage $r$ or stages $r$ and $q$ of the shift register 30 for placing the triggers in these stages in a condition corresponding to the input signal after its transition. Thus if the transition is from a "1" to a "0" state, the stages $r$ and $q$ of the shift register 30 are converted to the 0 state, and if the transition is from the 0 to the 1 state, the stages $r$ and $q$ of the shift register 30 are converted to the 1 state. The final state $q$ is shown within a dotted rectangle to indicate that it may be eliminated if only a three-bit code word is to be generated instead of a four-bit code word.

The other output of the transition detector 20 is passed through conductor 28 to code generator 40 which may comprise logic circuits such as AND- and OR-gates which together with another output 25 from the zone counter 22 generates the code for the location of the transition in the pattern in accordance with the Table II above. This code is then transferred to the stages $a$ and $b$ of the shift register 30 via conductors 42 and 44, respectively.

As soon as the code word has been set up in the shift register 30, it is stepped by the pulses from the zone counter 22 through its output conductor 46 for transmission to the receiver circuit shown in FIG. II.

C. At Receiver

Referring now to FIG. II, the incoming code word signal is introduced on conductor 50 and connected directly via conductor 52 to a clock pulse generator 54 which may comprise a trigger circuit for generating pulses at the bit frequency of the income code word signal. The output of this generator 54 conducts pulses via conductor 56 to operate the zone counter 60 which may comprise a pair of trigger circuits for counting the number of bits in the code word.

The other branch of the input conductor 50, namely conductor 53, directly connects the input code word signals to a receiving shift register 70, which comprises one more stage of trigger circuits than the number of bits in the code word, namely herein bit stages $b$, $a$, $r$, $q$, and $p$. The latter or $p$ stage shown in a dotted rectangle is used only when four-bit words are received and is eliminated from the system when only three-bit words are received. Thus the entrance of the bit stream takes place in equal time steps V as indicated by the following Table III from a time $t$:

TABLE III

| Shift register with bit-places | | | | | b | a | r | q | p |
|---|---|---|---|---|---|---|---|---|---|
| Entrance of the bit-stream into the shift register 70 at the points of time: | t | | b | a | r | q | p | | |
| | t + V | | | b | a | r | q | p | |
| | t + 2V | | | | b | a | r | q | p |
| | t + 3V | | | | | b | a | r | q | p |
| | t + 4V | | | | | | b | a | r | q | p |
| | t + 5V | | | | | | | b | a | r | q | p |
| | | | | | | | | | code word | | |

⟵⟶

At the point of time t + 5V the code word b, a, r, q is registered in the correspondingly identified stage triggers of the shift register 70, while the bit p in the last stage of this register announces the signal transition by being in the opposite condition from the triggers in stages r and q. Similarly, if only a three-bit word is received, then the trigger in stage q would give this announcement. Since the last bit of a code word in the shift register 70 is opposite to that of next to the last bit, the transition is definitely detected, and the bits q and r, or r alone in a case of a three-bit word, have conditions corresponding to the state after the transition.

If a four-bit word is received, then a majority decision circuit 82 for detecting two-out-of-three similar bit conditions may be employed in the first logic circuit 80 of NAND or AND-gates connected to each of these stages r, q, and p, of the shift register 70 via conductors 76, 74 and 72, respectively. Thus a signal transition will be detected in the majority decider 82 if the following conditions have been set up in the last three stages r, q, and p of the shift register 70 for a four-bit coded word:

TABLE IV

| | ~SHIFT REGISTER | | | | |
|---|---|---|---|---|---|
| | b | a | r | q | p |
| from 1 to 0 in the two cases | x | x | 0 | 0 | 1 |
| | x | x | 0 | 1 | 0 |
| from 0 to 1 in the two cases | x | x | 1 | 1 | 0 |
| | x | x | 1 | 0 | 1 |

⟵bit-stream

Thus if an error occurs and the code word is not perfect, but the majority of these three-bits r, q, and p are different from the previous condition of these stage triggers, then a transition is detected. This majority decider 82, indicated by a dotted rectangle in the first logic circuit 80, may comprise NAND-gates and is only used when four-bit words are to be detected, and is eliminated in the system where only three-bit words are to be detected wherein the last stage p of the shift register 70 is also eliminated. Thus the first logic circuit detects the state after the transition, and its output is conducted via conductor 84 to a signal generator 100.

If it is decided to determine the location or time zone of this detected signal transition, the triggers corresponding to the code word bits b and a in the shift register 70 indicate the time zone by means of their 1 or 0 conditions in accordance with the following Table V:

TABLE V

| transition of the signal from: | | | | | | |
|---|---|---|---|---|---|---|
| "1" to "0" | | | zone | "0" to "1" | | |
| b | a | r | | b | a | r |
| 0 | 0 | 0 | 0 | 1 | 1 | 1 |
| 1 | 0 | 0 | 1 | 0 | 1 | 1 |
| 0 | 1 | 0 | 2 | 1 | 0 | 1 |
| 1 | 1 | 0 | 3 | 0 | 0 | 1 |
| x | x | 1 | 3 | x | x | 0 |

This determination is made in a second logic circuit or zone indicator 90 of AND-gates by a connection to the time zone counter 60 via conductor 64, and connections via conductors 78 and 79 to stages a and b, respectively, and also the connection via conductor 77 to stage r of the shift register 70 as indicated in Table V above. Thus when the majority of bits registered in stages r, q, and p of the shift register 70 have such a value that a signal transition is detected, the value or condition of the stage corresponding to the r-bit is also considered for determination of the time zone of that transition. If the transition is from 1 to 0, r should have a value of 0 as shown in the above Table V above, but if the r-bit has a value of 1, the transition time zone is considered to be zone 3 irrespective of the conditions of stages of the triggers for bits b and a. Similarly, for the transition from 0 to 1, the r-bit should have a value 1, but if it has the value 0, the transition is supposed to have taken place in zone 3.

The result of the indication of the transition time zone as shown in Table V is then conducted from the second logic circuit or zone indicator 90 via conductor 92 to the signal generator 100, which together with the indication from the first logic circuit 80 through conductor 84, and the clock pulses via conductor 57 reforms a two state signal similar to the input signal to conductor 10 in FIG. I, by means of other logic circuits, such as AND-gates and a trigger circuit. One of the two outputs of this signal generator 100 is conducted via conductor 102 to set the triggers in the stages a and b of the shift register 70 into the same condition as the trigger in the stages of the detected transition, namely of stages r, or r and q, assuming the word was properly received. Thus as the code word is stepped through the shift register 70 by the pulses from the zone counter 60 or four times multiplier via its output conductor 62, an additional transition will not be detected in the first logic circuit 80 as the triggers of stages r, q, and p would be changed thereby. The other output 104 from the signal generator 100 is for the reformed two state signal which is conducted to the subscriber for this signal.

While there is described above the principles of this invention in connection with specific apparatus, it is to be clearly understood that this description is made only by way of example and not as a limitation of the scope of this invention.

I claim:

1. An apparatus for the transfer of point of time and direction of a transition between two states of an input signal comprising:
   A. means for continuously scanning said input in at least three successive equal time intervals (V) for determining the position time zone (0, 1, 2, 3) of said transition in a co-incident time interval,
   B. means for generating binary bits for each time interval, comprising one bit repeatedly for one continuous state and the other bit repeatedly for the other continuous state,
   C. means for generating a code word comprising less than five successive binary bits, two of which bits ($b$, $a$) indicate said position time zone, and the remaining bits ($r$, $q$) indicate the direction of said transition, in accordance with Table II of this specification
   D. means for transmitting said bits including said code word,
   E. means for receiving said bits including said code word, and
   F. means for determining from said received code word the direction of transition.

2. An apparatus according to claim 1 wherein said code word comprises four-bits ($b$, $a$, $r$, $q$).

3. An apparatus according to claim 1 wherein said code word comprises three-bits ($b$, $a$, $r$).

4. An apparatus according to claim 1 wherein said predetermined number of times of scanning per time interval is four.

5. An apparatus according to claim 1 wherein said means for determining from said received code word includes means for the determining of the said position time zone of said transition.

6. An apparatus according to claim 1 wherein said means for the receiving of said bits includes means for stepping said bits through a shift register having one more stage than the number of bits in said code word.

7. An apparatus according to claim 6 including means for the setting of the condition of the stages ($a$, $b$) of said shift register that correspond to the position time zone bits in said code word to the condition corresponding to the determined direction of transition.

8. An apparatus according to claim 2 wherein said means for determining from said received code word includes means for determining two-out-of-three bits ($r$, $q$, $p$) for said direction of transition.

* * * * *

UNITED STATES PATENT OFFICE
CERTIFICATE OF CORRECTION

Patent No. 4,003,042          Dated January 11, 1977

Inventor(s) Hendrik Cornelis Anthony van Duuren

It is certified that error appears in the above-identified patent and that said Letters Patent are hereby corrected as shown below:

Page 1, [73]   Patent should be assigned to -- De Staat der Nederlanden, ten dezen vertegenwoordigd door de Directeur-Generaal der Posterijen, Telegrafie en Telefonie --.

Signed and Sealed this

Eighteenth Day of April 1978

[SEAL]

Attest:

RUTH C. MASON
Attesting Officer

LUTRELLE F. PARKER
Acting Commissioner of Patents and Trademarks